US010713248B2

(12) United States Patent
Gerweck et al.

(10) Patent No.: US 10,713,248 B2
(45) Date of Patent: Jul. 14, 2020

(54) QUERY ENGINE SELECTION

(71) Applicant: AtScale, Inc., San Mateo, CA (US)

(72) Inventors: Sarah Gerweck, Santa Clara, CA (US);
David Ross, San Francisco, CA (US);
David P. Mariani, San Mateo, CA (US); Matthew Baird, Belmont, CA (US)

(73) Assignee: AtScale, Inc., San Mateo, CA (US)

( * ) Notice: Subject to any disclaimer, the term of this patent is extended or adjusted under 35 U.S.C. 154(b) by 191 days.

(21) Appl. No.: 15/657,198

(22) Filed: Jul. 23, 2017

(65) Prior Publication Data

US 2019/0026335 A1    Jan. 24, 2019

(51) Int. Cl.
| | | |
|---|---|---|
| *G06F 16/2453* | (2019.01) | |
| *G06F 16/2455* | (2019.01) | |
| *G06F 16/2458* | (2019.01) | |
| *G06F 16/2457* | (2019.01) | |

(52) U.S. Cl.
CPC .... *G06F 16/24542* (2019.01); *G06F 16/2455* (2019.01); *G06F 16/2457* (2019.01); *G06F 16/2471* (2019.01); *G06F 16/24564* (2019.01); *G06F 16/24573* (2019.01); *G06F 16/24575* (2019.01); *G06F 16/24578* (2019.01)

(58) Field of Classification Search
CPC ........... G06F 16/24542; G06F 16/2471; G06F 16/24564; G06F 16/245; G06F 16/2455; G06F 16/24553; G06F 16/2457; G06F 16/24573; G06F 16/24575; G06F 16/24578

See application file for complete search history.

(56) References Cited

U.S. PATENT DOCUMENTS

| | | | |
|---|---|---|---|
| 6,684,207 B1 | 1/2004 | Greenfield et al. | |
| 8,010,554 B1 | 8/2011 | Zhou | |
| 8,965,827 B2 * | 2/2015 | Burris | G06N 5/027 706/47 |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — David T. Brooks
(74) *Attorney, Agent, or Firm* — Armis IP Law, LLC

(57) ABSTRACT

Techniques are presented for rule-based selection of query engines for performing data operations on a variety of datasets stored in heterogeneous data storage environments. Data statements for a subject dataset are mapped to a logical data structure representation of the subject dataset to formulate a logical plan for the data statements. The data statements are analyzed to derive a set of statement attributes associated with the data statements. Query engine attributes describing the query engines available to query various instances of the subject dataset are accessed. A set of query engine selection rules are evaluated subject to the statement attributes and/or the query engine attributes to dynamically select a target query engine for the data statements. A physical plan structured for the target query engine is generated from the logical plan. The physical plan is executed on the target query engine to perform data operations on the subject dataset.

19 Claims, 12 Drawing Sheets

(56) References Cited

U.S. PATENT DOCUMENTS

| | | | |
|---|---|---|---|
| 9,141,665 B1* | 9/2015 | Munro | G06F 16/2453 |
| 9,600,554 B2 | 3/2017 | Gerweck et al. | |
| 2003/0126114 A1* | 7/2003 | Tedesco | G06F 16/2455 |
| 2004/0236767 A1 | 11/2004 | Soylemez et al. | |
| 2005/0278290 A1 | 12/2005 | Bruce | |
| 2007/0208721 A1 | 9/2007 | Zaman | |
| 2008/0016147 A1* | 1/2008 | Morimoto | G06F 16/951 |
| | | | 709/203 |
| 2008/0256047 A1* | 10/2008 | Dettinger | G06F 16/90335 |
| 2009/0018996 A1 | 1/2009 | Hunt et al. | |
| 2009/0055388 A1* | 2/2009 | Song | G06F 16/951 |
| 2009/0249125 A1 | 10/2009 | Bhatawdekar et al. | |
| 2009/0300341 A1* | 12/2009 | Buehler | G06F 9/44505 |
| | | | 713/1 |
| 2009/0327224 A1* | 12/2009 | White | G06F 16/951 |
| 2011/0153584 A1* | 6/2011 | Wei | G06F 9/505 |
| | | | 707/706 |
| 2011/0252049 A1 | 10/2011 | Marinescu et al. | |
| 2012/0059839 A1* | 3/2012 | Andrade | G06F 16/252 |
| | | | 707/760 |
| 2012/0089564 A1 | 4/2012 | Bakalash et al. | |
| 2012/0102453 A1 | 4/2012 | Patch et al. | |
| 2015/0278334 A1* | 10/2015 | Gerweck | G06F 16/283 |
| | | | 707/706 |
| 2016/0162546 A1* | 6/2016 | Oh | G06F 16/24542 |
| | | | 707/718 |
| 2017/0147582 A1* | 5/2017 | Michels | G06F 16/24578 |
| 2018/0046643 A1* | 2/2018 | Brodt | G06F 16/178 |
| 2018/0060394 A1* | 3/2018 | Gawande | G06F 9/5022 |
| 2018/0247247 A1* | 8/2018 | Xu | G06Q 10/06393 |

OTHER PUBLICATIONS https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/0022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

\* cited by examiner

QUERY ENGINE SELECTION

FIELD

This disclosure relates to data analytics, and more particularly to techniques for query engine selection.

BACKGROUND

The design and implementation of modern data storage environments are driven by increasing volume, velocity, and variety of information assets (e.g., data). Although all three components of data management are growing, variety often has the most influence on data storage investment and/or implementation decisions. As an example, an enterprise might desire to have access to 100 TB or more of data that comprises some datasets stored in a variety of modern heterogeneous data storage environments (e.g., Hadoop distributed file system or HDFS), as well as some other datasets stored in a variety of legacy data storage environments (e.g., relational database management systems or RDBMS). Another aspect of variety pertains to the structure of the data (e.g., data type) comprising the datasets. Datasets are represented in various structures or formats ranging from schema-free JSON datasets, to delimited flat file datasets, to non-flat datasets (e.g., Avro, Parquet, XML, etc.), to nested data types within other databases (e.g., relational databases, NoSQL databases, etc.). The variety of data types is continually increasing.

The existence of such a wide range of data organization and/or storage implementations has given rise to the development of specialized query engines that are developed to serve a particular respective data type and/or data storage environment. These query engines are architected to efficiently manipulate data (and associated metadata) of a particular representation, and/or to efficiently store and retrieve data within a particular data storage environment. Such query engines can support distinctly different functional capabilities and distinctly different performance characteristics. In some cases, multiple query engines are available for a particular data storage environment and data type combination. In some cases, specialized query engines are tuned for a particular commercial use. As examples, multiple query engines (e.g., Impala, Hive, Spark, Presto, Drill, Pig, etc.) might be available to query datasets in a "big data" environment such as HDFS.

Unfortunately, given the panoply of available query engines, identifying which query engine to use for certain data statements (e.g., comprising a data query) is fraught with challenges. Further, developing data statements that are formatted for each identified query engine so as to take advantage of that query engine's capabilities can also present challenges. One legacy approach to addressing such challenges is to determine a priori a target query engine for a particular set of data statements. The data statements are then structured for the target query engine to efficiently operate over a subject dataset. With this approach, however, the data statements might not perform efficiently (or at all) on query engines other than the query engine for which the data statements had been structured.

Conditions that might demand consideration and selection of an alternate query engine can arise from a wide range of causes. For example, a need to select an alternate query engine can result due to a temporary outage of the target query engine (e.g., the query engine server is down), or due to a migration of the underlying dataset to another environment served by a different query engine, or due to the availability of a new query engine with enhanced capabilities that are accessed with new syntax (e.g., instructions, statements, hints, etc.), and so on. In any of such cases, the original data statements that were formulated for the original target query engine might not perform as intended, or might not perform at all. Further, the user (e.g., business intelligence analyst) and/or system issuing the data statements might not be aware of some or all of the alternate query engines available at the moment in time the original data statements are being formulated. Legacy approaches where alternate query engines are considered or reconsidered each time data statements are invoked wastes a significant amount of human effort and wastes a significant amount of computing, storage, networking, and other resources. What is needed is a technological solution that facilitates efficient identification and use of query engines that are available to process data operations on datasets stored in multiple heterogeneous environments.

Therefore, what is needed is a technique or techniques to improve over legacy techniques and/or over other considered approaches that address efficiently identifying and using query engines for data operations on a variety of datasets stored in heterogeneous data storage environments. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for query engine selection, which techniques advance the relevant technologies to address technological issues with legacy approaches. More specifically, the present disclosure describes techniques used in systems, methods, and in computer program products for real-time selection of query engines from heterogeneous data storage environments. Certain embodiments are directed to technological solutions for dynamically selecting a target query engine for data statements to facilitate the transformation of a logical plan for the data statements into a physical plan that is structured for the target query engine.

The disclosed embodiments modify and improve over legacy approaches. In particular, the herein-disclosed techniques provide technical solutions that address the technical problems attendant to efficiently identifying and using query engines for data operations on a variety of datasets stored in heterogeneous data storage environments. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of database query manipulation as well as advances in various technical fields related to data storage and data access.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
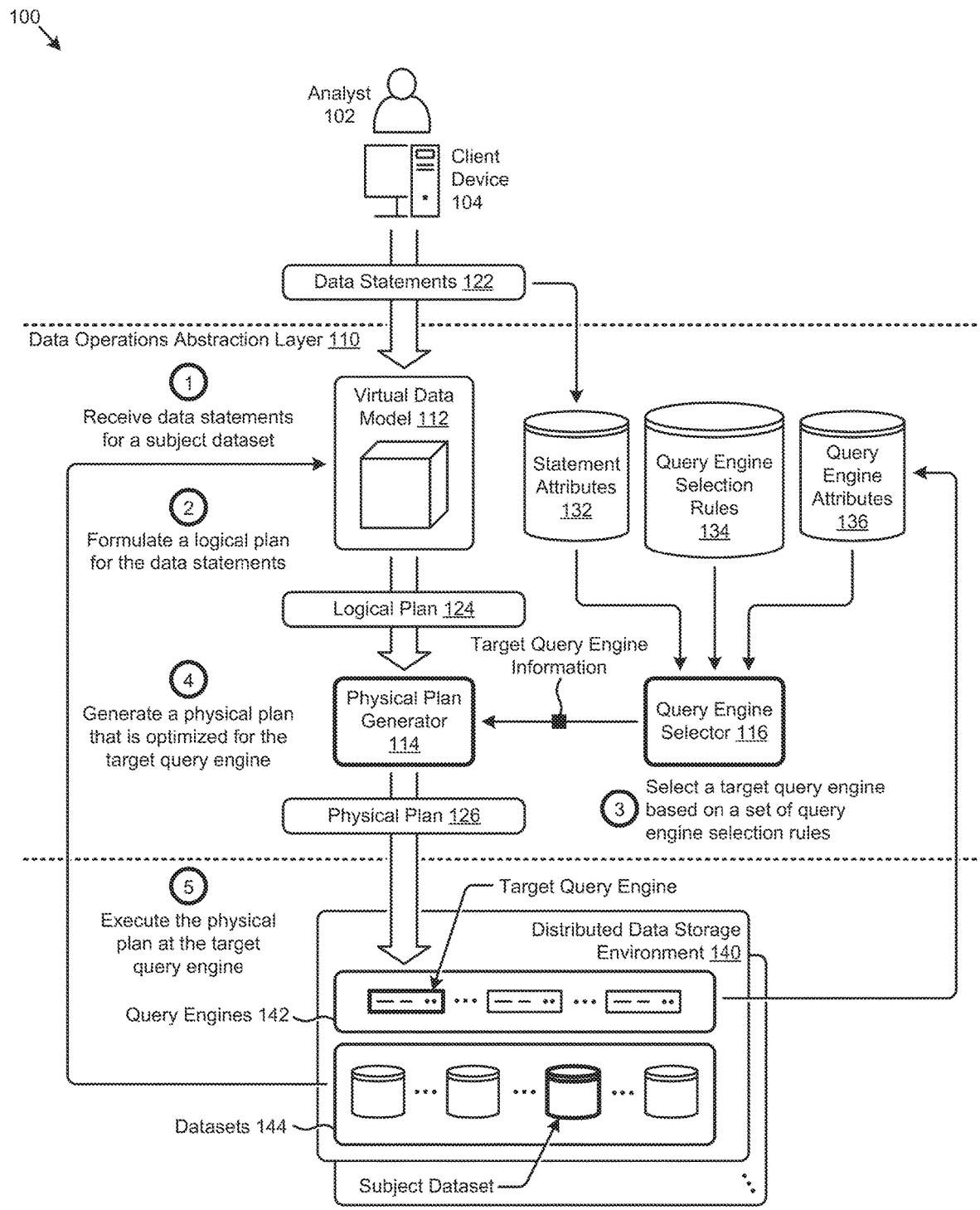
FIG. 1 is a diagram that depicts several implementation techniques pertaining to real-time selection of query engines from heterogeneous data storage environments, according to some embodiments.

Embodiments in accordance with the present disclosure address the problem of efficiently identifying and using query engines for data operations on a variety of datasets stored in heterogeneous data storage environments. Some embodiments are directed to approaches for dynamically selecting a target query engine for issued data statements to facilitate the transformation of a logical plan for the data statements into a physical plan that is structured for the target query engine. The accompanying figures and discussions herein present example environments, systems, methods, and computer program products for real-time selection of query engines from heterogeneous data storage environments.

Overview

Disclosed herein are techniques for dynamically selecting a target query engine for issued data statements to facilitate the transformation of a logical plan for the data statements into a physical plan that is structured for the target query engine. In certain embodiments, the data statements for a subject dataset are mapped to a logical data structure representation (e.g., virtual multidimensional data model) of the subject dataset to formulate the logical plan for the data statements. The data statements are also analyzed to derive a set of statement attributes associated with the data statements. Various query engine attributes describing the query engines available to query various instances of the subject dataset are accessed. A set of query engine selection rules are evaluated subject to the statement attributes and/or the query engine attributes to dynamically select a target query engine for the data statements.

A physical plan for the target query engine is then generated from the logical plan based in part on the query engine attributes of the target query engine. The physical plan is then executed on the target query engine to return a result set to the issuer of the data statements. In certain embodiments, the physical plan is generated to achieve certain performance objectives when accessing the target query engine. In certain embodiments, the query engine attributes are dynamically updated in response to any changes pertaining to the set of available query engines. In certain embodiments, at least some of the query engine selection rules are derived from a set of user preferences.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 is a diagram that depicts several implementation techniques 100 pertaining to real-time selection of query engines from heterogeneous data storage environments. As an option, one or more variations of implementation techniques 100 or any aspect thereof may be implemented in the context of the architecture and functionality of the embodiments described herein. The implementation techniques 100 or any aspect thereof may be implemented in any environment.

The diagram shown in FIG. 1 is merely one example representation of the herein disclosed techniques that facilitate real-time selection of query engines from heterogeneous data storage environments. As shown, a target query engine is selected according to the herein disclosed techniques from a variety of query engines 142 (e.g., Impala, Spark SQL, Hive, Drill, Presto, etc.) that are implemented to access various datasets (e.g., datasets 144) in a distributed data storage environment 140. The distributed data storage environment 140 represents any combination of data storage environments (e.g., HDFS, AWS, RDBMS, etc.) that facilitate storage of and access to distributed data having various schemata and structural forms (e.g., data types). In such data storage environments, a large subject dataset (e.g., a data table with 100 billion rows) is often physically distributed over multiple physical storage devices, but accessed by a query engine as a single logical dataset.

An analyst 102 that desires to query any of the datasets 144 in distributed data storage environment 140 might be presented with challenges pertaining to efficiently selecting and using a query engine to analyze a particular subject dataset. One legacy approach is to determine a priori a target query engine for a particular set of data statements (e.g., data query). The data statements are then structured for the target query engine to efficiently query a subject dataset. However, when conditions arise (e.g., target query engine is down, subject datasets are moved, etc.) that might demand consideration and selection of an alternate query engine, the data statements might not perform efficiently (or at all) on the alternate query engine. Further, the user (e.g., analyst 102) and/or the system issuing the data statements might not be aware of some or all of the alternate query engines available at the moment in time the original data statements are being formulated. Legacy approaches where alternate query engines are considered or reconsidered each time data statements are formulated wastes a significant amount of human effort and wastes a significant amount of computing, storage, networking, and other resources.

The herein disclosed techniques address such problems attendant to the efficient identification and usage of query engines for executing data operations on the variety of datasets 144 stored in heterogeneous data storage environments such as distributed data storage environment 140. In certain embodiments, a query engine selector 116 and a physical plan generator 114 are implemented in a data operations abstraction layer 110 to facilitate the herein disclosed techniques. A data operations abstraction layer, such as data operations abstraction layer 110, transforms data statements of a first structure into respective physical plans comprising data operations of a second structure that are processed by various query engines for analyses of datasets stored in a plurality of data storage environments. As an example, data operations abstraction layer 110 might transform a SQL data statements from Tableau into a physical plan comprising one or more data operations that are interpreted by an Impala query engine to operate on a dataset in an HDFS environment.

In certain embodiments, a virtual data model 112 is implemented in the data operations abstraction layer 110 to facilitate querying a variety of datasets in a variety of environments. A virtual data model, such as virtual data model 112, comprises data model attributes that are organized to define one or more logical data structure representations of various subject datasets and/or various instances of subject datasets. Such data model attributes might describe a set of dimensions, measures, relationships (explicit or inferred), and/or other attributes that define the virtual data model 112 (e.g., virtual multidimensional data model). The virtual data model 112 constrains the set of feasible representations of the associated subject datasets.

The virtual data model 112 is herein characterized as "virtual" since the model is an abstracted logical representation of the structures of the underlying subject datasets. For example, virtual data model 112 can represent a subject delimited flat file as a multidimensional data cube to facilitate various analyses of the flat file dataset by analyst 102. The virtual nature of virtual data model 112 also characterizes the ability to form any number of virtual cubes from virtual data model 112 to facilitate analyses of various subject datasets. Such virtual cubes are variants of virtual data model 112 that have an underlying data model structure that is shared with virtual data model 112, but that have varying combinations of the attributes (e.g., dimensions, measures, relationships, etc.) that comprise the data model structure. For example, virtual data model 112 might define both an "Order Year" and an "Order Month" that is mapped to the underlying subject dataset, whereas a first virtual cube might merely represent the "Order Year" while a second virtual cube might merely represent the "Order Month".

As shown in FIG. 1, analyst 102 might use virtual data model 112 to issue the data statements 122 from a client device 104 for a subject dataset from datasets 144. Such data statements can comprise data definition language (DDL) statements, data manipulation language (DML) statements (e.g., data queries), transaction control statements, session control statements, system control statements, embedded statements, and/or other structured programming code to operate over one or more datasets. Upon receiving the data statements 122 at the data operations abstraction layer 110 (operation 1), a logical plan 124 is formulated for the data statements (operation 2). A logical plan, such as logical plan 124, is a programming code object representation of the semantics of data statements in terms of the underlying subject dataset as facilitated by the virtual data model. Specifically, the virtual data model (e.g., virtual data model 112) facilitates a mapping of the parameters of the data statements (e.g., data selection, data source, selection conditions, etc.) to respective data model attributes. For example, a data selection parameter from one or more data statements can correspond to a measure in a virtual data model, and/or can correspond to values of a dimensional attribute (e.g., the city in a geographic hierarchy or the calendar date in a time hierarchy).

FIG. 1 illustrates that query engine selector 116 accesses a set of statement attributes 132 corresponding to the data statements 122. Such statement attributes might be separate from, or derived from, the data statements (e.g., "SELECT" statements, "FROM" statements, etc.) and/or parameters of the data statements. For example, the statement attributes might describe the user issuing the data statements, the time the statements are issued, and/or the estimated cost of executing the data statements. The query engine selector 116 further accesses a set of query engine attributes that describe the query engines 142 in distributed data storage environment 140. The query engine attributes 136 might describe the make, model, status, various capabilities, and/or other attributes of each query engine. The statement attributes 132 and/or the query engine attributes 136 are applied to a set of query engine selection rules 134 at query engine selector 116 to select a target query engine (operation 3).

A set of rules (e.g., a rule base) such as query engine selection rules 134 comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results and/or invokes one or more actions. For example, according to the herein disclosed techniques, certain inputs (e.g., one or more statement attributes and/or query engine attributes) are applied to query engine selection rules 134 to select a target query engine for a particular set of data statements (e.g., data query).

Certain information (e.g., engine identifier) to identify the selected target query engine is delivered to physical plan generator 114. Certain query engine attributes of the identified target query engine are accessed by physical plan generator 114 to generate a physical plan 126 from the logical plan 124 (operation 4). A physical plan, such as physical plan 126, comprises one or more data operations that are interpreted by a query engine (e.g., target query engine) to perform a query of a subject dataset. The herein disclosed techniques facilitate generating data operations comprising a physical plan that are organized and/or structured to efficiently use a dynamically selected target query engine. Specifically, the data operations might be structured to achieve certain performance objectives (e.g., minimization of query cost, latency, etc.). The physical plan 126 is then executed at the target query engine to return a result set to analyst 102 (operation 5).

In comparison to the earlier mentioned legacy approaches, the herein disclosed techniques serve to reduce the demand for computing, storage, and networking resources by dynamically transforming a single set of data statements (e.g., single data query) into multiple instances of physical plans, each structured to be executed on a respective target query engine. In this case, the user (e.g., analyst 102) does not consume resources to generate multiple versions of data statements for various target query engines. Further, the herein disclosed techniques facilitate selection of target query engines that may be contemporaneously implemented (e.g., not known by the user when the data statements are issued) and/or modified. Other improvements in computer functionality are facilitated by the herein disclosed techniques.

Figure 2:
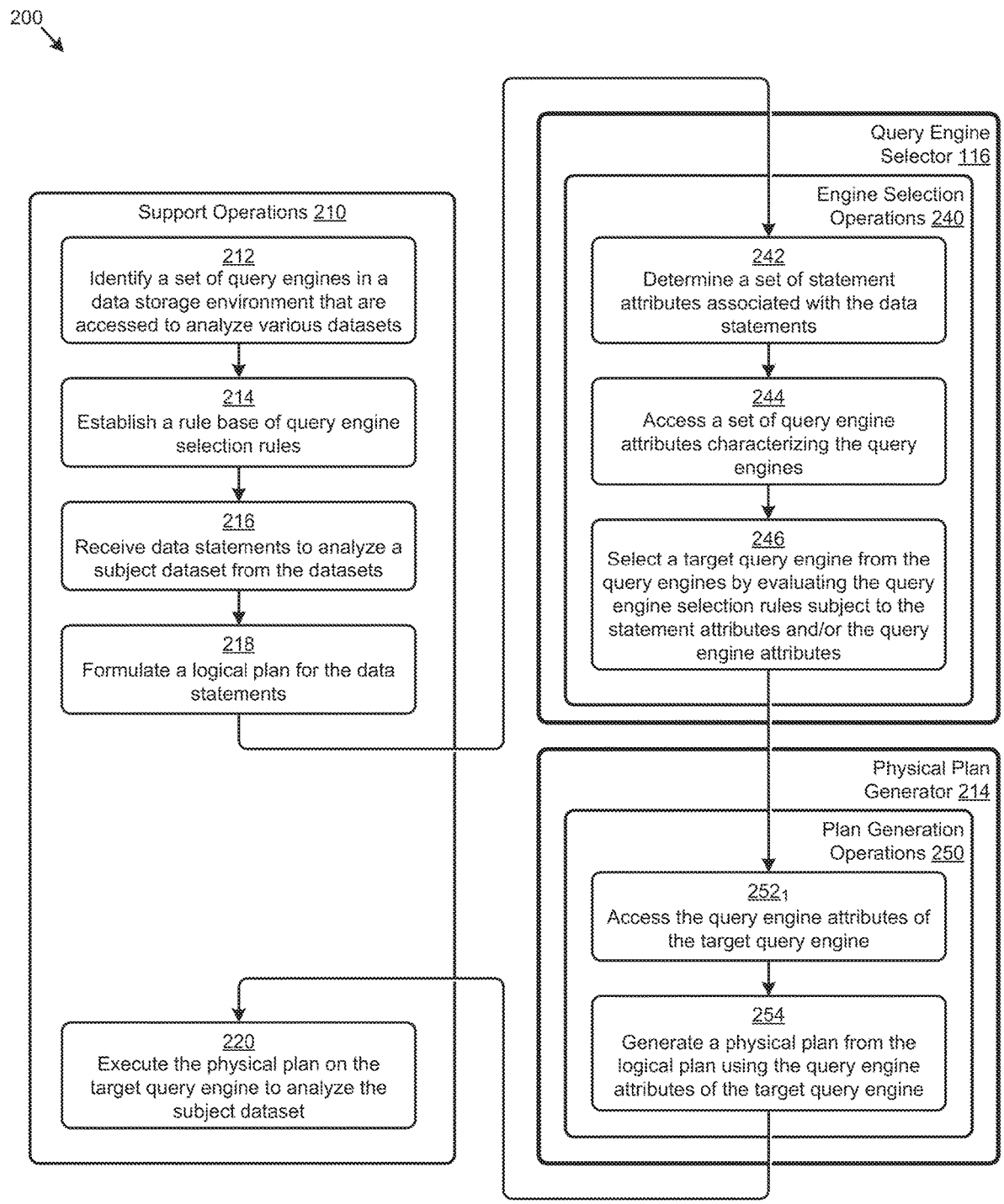
FIG. 2 depicts a query processing technique as implemented in systems that facilitate real-time selection of query engines from heterogeneous data storage environments, according to some embodiments.

An embodiment of the herein disclosed techniques as implemented in a query processing technique is shown and described as pertains to FIG. 2.

FIG. 2 depicts a query processing technique 200 as implemented in systems that facilitate real-time selection of query engines from heterogeneous data storage environments. As an option, one or more variations of query processing technique 200 or any aspect thereof may be implemented in the context of the architecture and functionality of the embodiments described herein. The query processing technique 200 or any aspect thereof may be implemented in any environment.

The query processing technique 200 presents one embodiment of certain steps and/or operations that facilitate real-time selection of query engines from heterogeneous data storage environments. As shown, the steps and/or operations can be grouped in a set of support operations 210, a set of engine selection operations 240, and a set of plan generation operations 250. In certain embodiments, the engine selection operations 240 might be performed at query engine selector 116 and/or the plan generation operations 250 might be performed at physical plan generator 114.

As illustrated, the support operations 210 of the query processing technique 200 can commence by identifying a set of query engines in a data storage environment that are accessed to analyze various datasets (step 212). In some cases, the query engines might be identified from a manifest of query engines registered at the data storage environment. A rule base of query engine selection rules is also established (step 214). Such a rule base can be established by one or many contributors (e.g., analysts, system administrators, data model designers, etc.), including computing agents that might derive rules from other data sources (e.g., security policies, data availability policies, etc.). Upon receiving data statements for one of the datasets (step 216), a logical plan for the data statements is formulated (step 218).

The engine selection operations 240 commence with determining a set of statement attributes associated with the data statements (step 242). Such statement attributes might comprise attributes specified in the components (e.g., header, payload, etc.) of the issued data statements, attributes derived from the data statements, attributes calculated based on an analysis of the data statements, and/or other attributes. Various query engine attributes that describe the aforementioned query engines are accessed (step 244). Such query engine attributes might be recorded in the earlier mentioned manifest at the data storage environment, and/or extracted from the query engines, and/or collected and/or derived in another way. A target query engine is selected from the query engines by evaluating the query engine selection rules subject to the statement attributes and/or the query engine attributes (step 246).

The plan generation operations 250 commence with accessing the query engine attributes of the target query engine (e.g., as selected by the engine selection operations 240) (step 2520. The query engine attributes of the target query engine are used to generate a physical plan from the logical plan (step 254). As facilitated by the herein disclosed techniques, this physical plan can be organized and/or structured so as to access the specific capabilities (e.g., functions, features, processes, etc.) of the target query engine when performing operations on the subject dataset.

The physical plan (e.g., data operations) is then executed on the target query engine to analyze the subject dataset (step 220).

Figure 3A:
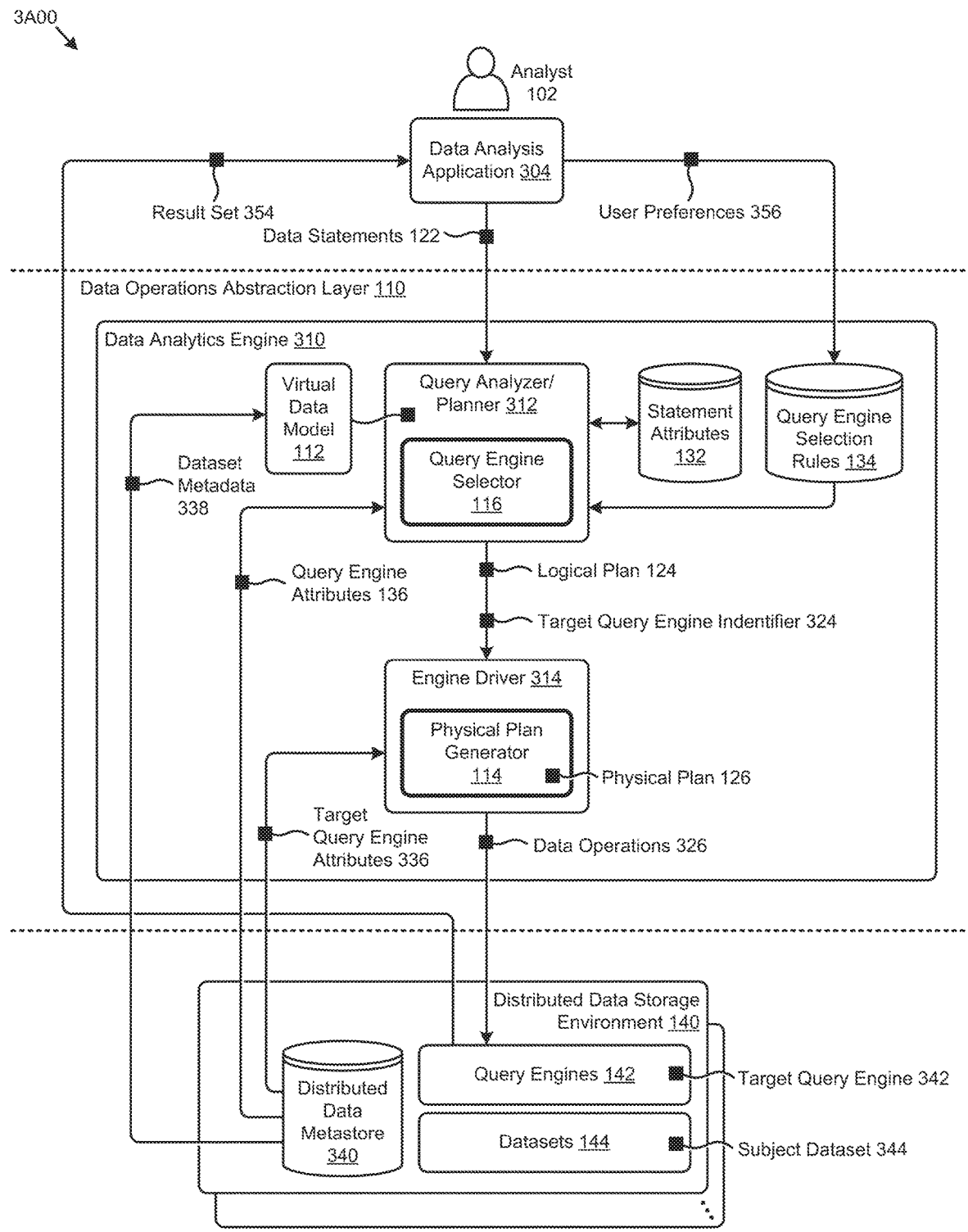
FIG. 3A is a block diagram of a query processing system that implements real-time selection of query engines from heterogeneous data storage environments, according to an embodiment.

A detailed embodiment of a system and data flows that implement the techniques disclosed herein is presented and discussed as pertains to FIG. 3A.

FIG. 3A is a block diagram of a query processing system 3A00 that implements real-time selection of query engines from heterogeneous data storage environments. As an option, one or more variations of query processing system 3A00 or any aspect thereof may be implemented in the context of the architecture and functionality of the embodiments described herein. The query processing system 3A00 or any aspect thereof may be implemented in any environment.

As shown in the embodiment of FIG. 3A, query engine selector 116 and physical plan generator 114 are implemented in a data analytics engine 310 to facilitate real-time selection and use of the query engines 142 in distributed data storage environment 140. In this embodiment, data analytics engine 310 serves to establish the data operations abstraction layer 110 earlier described. As can be observed, a query analyzer/planner 312 at data analytics engine 310 receives the data statements 122 from a data analysis application (e.g., business intelligence tool) managed by analyst 102. For example, data statements 122 might be issued to operate on a subject dataset 344 from the datasets 144 stored in distributed data storage environment 140. The query analyzer/planner 312 accesses the virtual data model 112 to generate the logical plan 124 for data statements 122. The logical data structure representation of the virtual data model 112 is based on at least a portion of a set of dataset metadata 338 associated with datasets 144. For example, virtual data model 112 might comprise various dimensions, measures, relationships, groupings, and/or other data model attributes derived from the portion of dataset metadata 338 associated with subject dataset 344. As shown, the dataset metadata 338 is accessed at a distributed data metastore 340 in distributed data storage environment 140.

The query engine selector 116 at query analyzer/planner 312 determines and/or records the statement attributes 132 associated with data statements 122 or any ingested data statements. The query engine selector 116 at query analyzer/planner 312 also accesses the query engine attributes 136 pertaining to query engines 142. As can be observed, query engine attributes 136 might be accessed at distributed data metastore 340 (e.g., in a query engine manifest file). Query engine selector 116 further accesses the query engine selection rules 134. In some cases, query engine selection rules 134 are specified in part by a set of user preferences 356 collected from data analysis application 304 and/or other sources. Using the statement attributes 132, the query engine attributes 136, and/or the query engine selection rules 134, the query engine selector 116 selects a target query engine for the data statements 122. As an example, a target query engine 342 from query engines 142 might be selected by query engine selector 116.

Information identifying the selected target query engine, such as a target query engine identifier 324, is presented to physical plan generator 114 at an engine driver 314. The physical plan generator 114 accesses the target query engine attributes 336 to generate a physical plan 126 from the logical plan 124 according to the herein disclosed techniques. Data operations 326 comprising the physical plan 126 are delivered by engine driver 314 for execution at target query engine 342. Responsive to executing the data operations, a result set 354 is returned by target query engine 342 to data analysis application 304.

The specific example of a query processing system shown in FIG. 3A is purely exemplary, and other systems and/or subsystems and/or partitions and/or data objects and/or data flows are reasonable. A detailed embodiment of the data structures of the various data objects implemented in such systems, subsystems, and/or partitions is shown and described as pertaining to FIG. 3B.

Figure 3B:
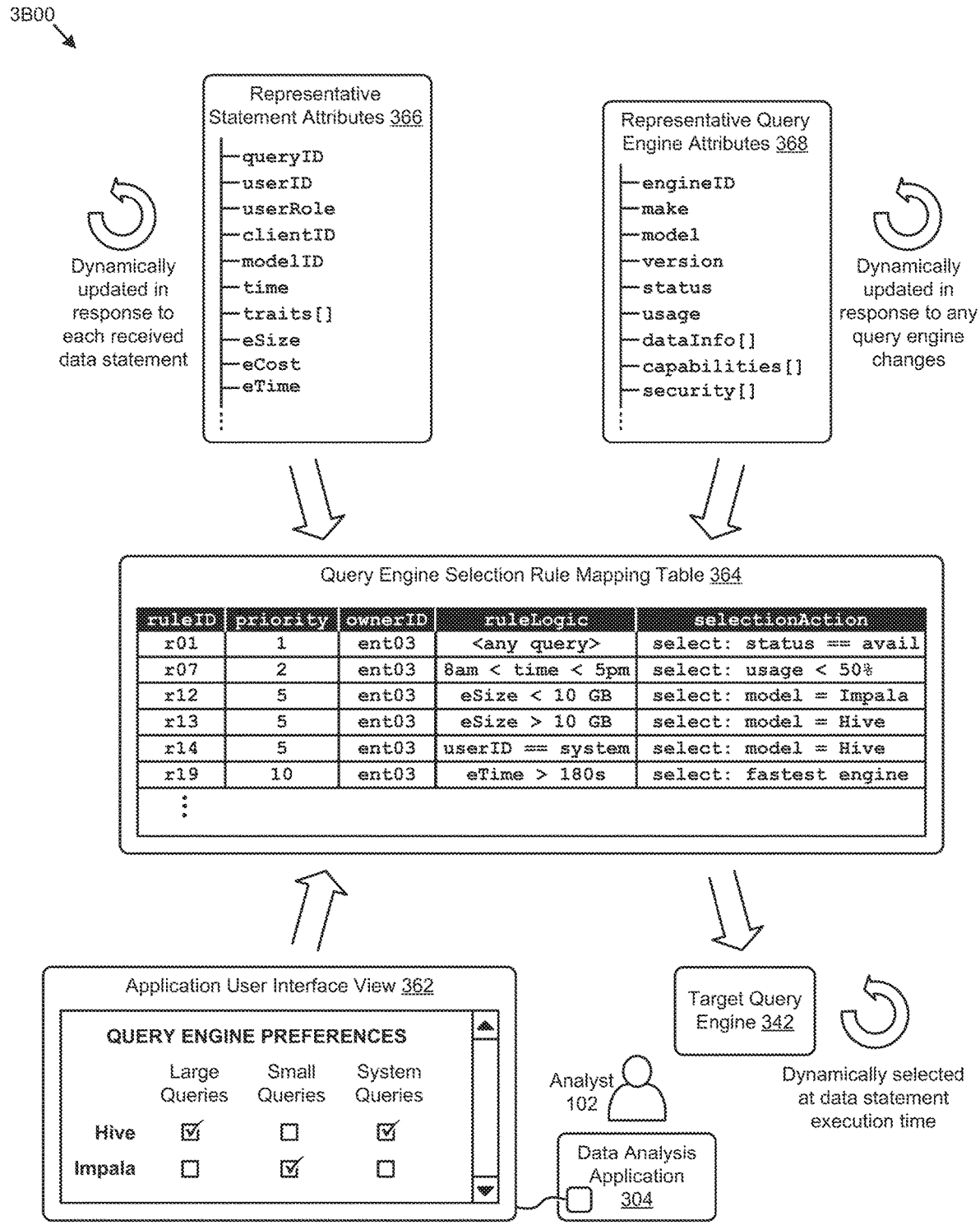
FIG. 3B depicts specialized data structures that improve the way a computer stores and retrieves data when selecting query data sources, according to an embodiment.

FIG. 3B depicts specialized data structures 3B00 that improve the way a computer stores and retrieves data when selecting query data sources. As an option, one or more variations of specialized data structures 3B00 or any aspect thereof may be implemented in the context of the architecture and functionality of the embodiments described herein. The specialized data structures 3B00 or any aspect thereof may be implemented in any environment.

The specialized data structures 3B00 shown in FIG. 3B are merely one representation of the structures of certain data objects that are implemented to facilitate the herein disclosed techniques. Certain relationships between the specialized data structures 3B00 also are illustrated in FIG. 3B. The data comprising the data objects represented by specialized data structure 3B00 can be organized and/or stored using various techniques. As can be observed, certain statement attributes derived from the data statements can comprise the attributes depicted in a set of representative statement attributes 366. The representative statement attributes 366 associate various attributes with a particular set of data statements. For example, representative statement attributes 366 might be organized and/or stored in a tabular structure (e.g., relational database table) that has rows corresponding to a particular data statement or set of data statements (e.g., data query) and columns corresponding to various attributes pertaining to the data statements or set of data statements, respectively. As another example, representative statement attributes 366 might be organized and/or stored in a programming code object that has instances corresponding to a particular data statement or set of data statements (e.g., data query) and properties corresponding to the various attributes pertaining to the data statements or set of data statements, respectively.

In any case, as depicted in representative statement attributes 366, a particular set (e.g., table row or object instance) of statement attributes might describe a query identifier (e.g., stored in a "queryID" field), a user identifier (e.g., stored in a "userID" field), a user role (e.g., stored in a "userRole" field), a client identifier (e.g., stored in a "clientID" field), a virtual data model identifier (e.g., stored in a "modelID" field), a timestamp (e.g., stored in a "time" field), a set of query traits (e.g., stored in a "traits [ ]" object), an estimated query size (e.g., stored in an "eSize" field), an estimated query cost (e.g., stored in an "eCost" field), an estimated query execution time (e.g., stored in an "eTime" field), and/or other statement attributes.

As described herein, one or more statement attributes (e.g., representative statement attributes 366) can be applied to a set of query engine selection rules to determine one or more target query engines for a particular data statement or set of data statements (e.g., data query). The query engine selection rules can be codified in various structures such as programming code logic, anonymous functions (e.g., lambda expressions), mapping tables, lookup tables, and/or other structures.

Specifically, a query engine selection rule mapping table 364 illustrates a mapping of statement attributes to query engine selection actions. The representative rules in query engine selection rule mapping table 364 are identified by entries in a "ruleID" column. The rules are also assigned a priority level in a "priority" column. An "ownerID" column indicates the entity (e.g., a data statement owner, a data query owner, etc.) associated with a rule. For example, the entity "ent03" might have established for its own restricted use the rules in query engine selection rule mapping table 364. Pseudo code in a "ruleLogic" column describes the evaluation technique (e.g., method, function, etc.) that is performed on the statement attributes for a respective rule. In the example rules shown in query engine selection rule mapping table 364, when the expression in the "ruleLogic" evaluates to a logically "true" outcome, the corresponding (e.g., in the same table row) action in the "selectionAction" column is performed. For example, rule "r01" selects only query engines that are available (e.g., "status=avail") for "<any query>". As another example, rule "r07" checks whether the time the data statements are issued is between 8 AM and 5 PM (e.g., "8 am<time<5 pm") and, if so, selects a target data source that is less than 50% utilized (e.g., "usage<50%").

The selection actions (e.g., in "select ionAction" column) determined from evaluating the rule logic (e.g., in "ruleLogic" column) are performed over a set of query engine attributes to determine what, if any, query engines are identified by the query engine selection rules. As depicted in representative query engine attributes 368, a particular set (e.g., table row or object instance) of query engine attributes might associate one or more attributes with a particular query engine identified by an engine identifier (e.g., stored in an "engineID" field). As shown, such attributes might describe a manufacturer (e.g., stored in a "make" field), a model (e.g., stored in a "model" field), a firmware or software version (e.g., stored in a "version" field), a status indicator (e.g., stored in a "status" field), a usage level value (e.g., stored in a "usage" field), a set of information pertaining to the accessed datasets (e.g., stored in a "dataInfo[ ]" object), a set of capabilities information (e.g., stored in a "capabilities [ ]" object), a set of security information (e.g., stored in a "security [ ]" object), and/or other attributes.

The attributes shown in representative query engine attributes 368 and/or other attributes for a respective set of candidate query engines can be consulted to carry out the selection actions for a particular rule. For example, if rule "r07" applies (e.g., "8 am<time<5 pm"), then the "usage" field of any candidate query engines will be checked to identify which query engines are less than 50% utilized. As another example, the "capabilities [ ]" object of any candidate query engines might be consulted to determine a "fastest engine" when rule "r19" is applied. When all rules are exhausted and/or when one candidate query engine remains, a target query engine 342 can be identified. As illustrated in FIG. 3B, the selection of target query engine 342 is a dynamic operation (e.g., target query engine is selected at data statement execution time) as facilitated by the herein disclosed techniques. Such dynamic selection of target query engines is due, in part, to the real-time updates of the statement attributes and/or query engine attributes in responsive to each received data statement and/or query engine change, respectively.

FIG. 3B further depicts an application user interface view 362 that can be used by analyst 102 at data analysis application 304 to submit one or more user preferences so as to affect one or more of the query engine selection rules. Specifically, application user interface view 362 presents a set of query engine selection options to analyst 102 for varying data query sizes and types. As shown, analyst 102 can select one of two query engines (e.g., a "Hive" query engine and an "Impala" query engine) for "Large Queries", "Small Queries", and "System Queries". The selections made by analyst 102 at application user interface view 362 are codified into rules "r12", "r13", and "r14", respectively, in query engine selection rule mapping table 364.

Figure 4A:
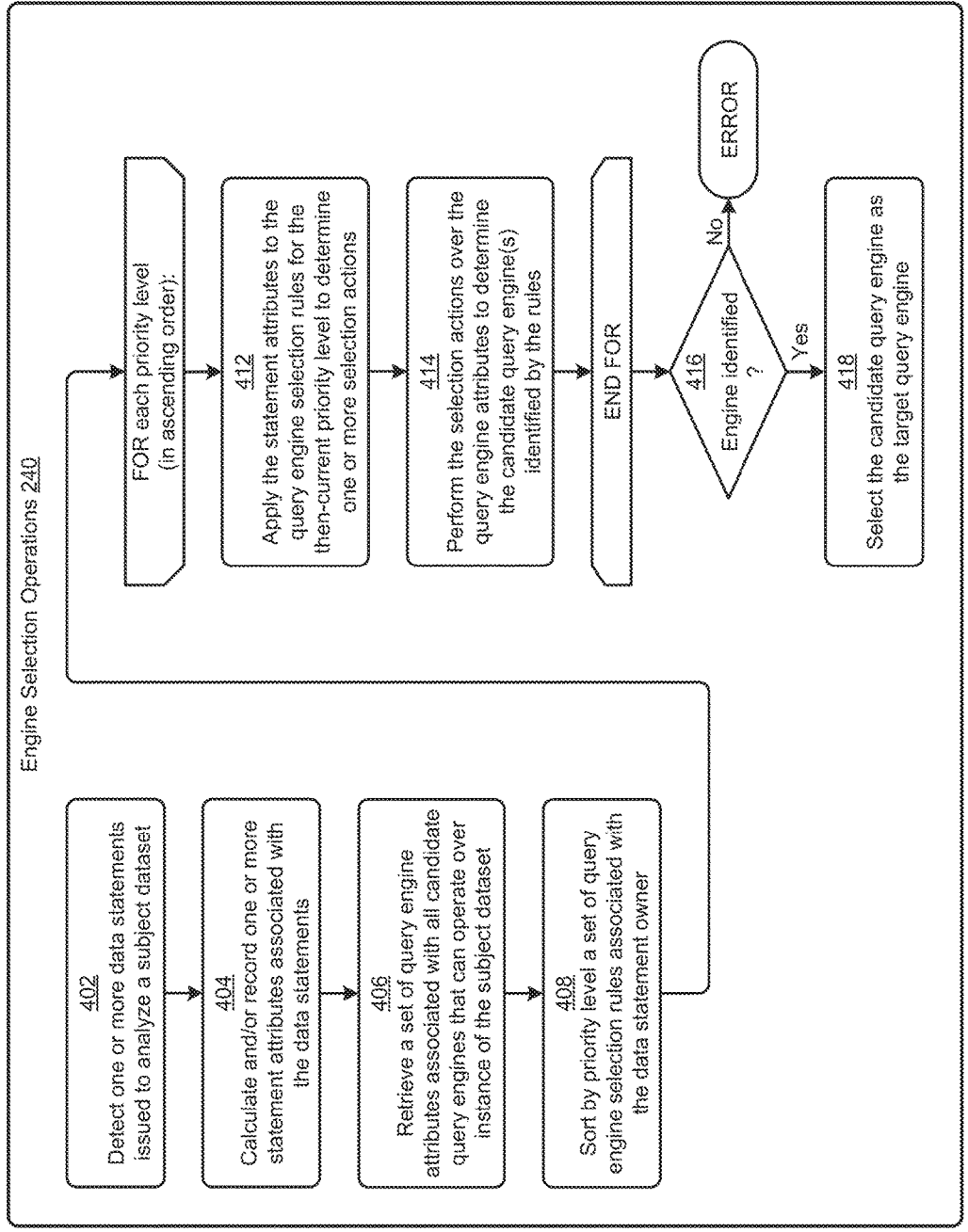
FIG. 4A presents a dynamic query engine selection technique as implemented in systems that facilitate real-time selection of query engines from heterogeneous data storage environments, according to an embodiment.
Figure 4B:
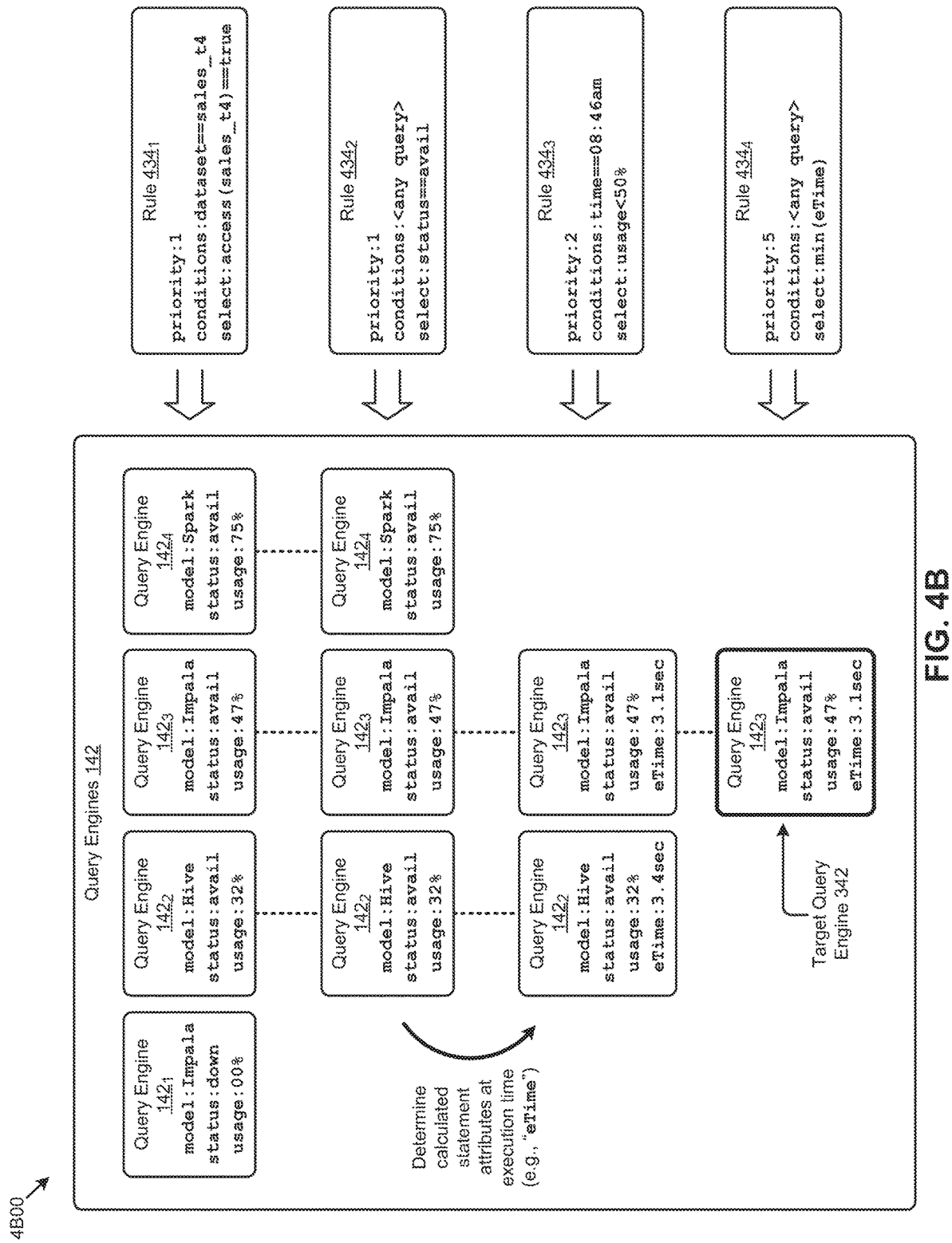
FIG. 4B illustrates a query engine selection scenario as occurs in systems that facilitate real-time selection of query engines from heterogeneous data storage environments, according to an embodiment.

Further details pertaining to selecting a target query engine according to the herein disclosed techniques are shown and described as pertains to FIG. 4A and FIG. 4B.

FIG. 4A presents a dynamic query engine selection technique 4A00 as implemented in systems that facilitate real-time selection of query engines from heterogeneous data storage environments. As an option, one or more variations of dynamic query engine selection technique 4A00 or any aspect thereof may be implemented in the context of the architecture and functionality of the embodiments described herein. The dynamic query engine selection technique 4A00 or any aspect thereof may be implemented in any environment.

The dynamic query engine selection technique 4A00 presents one embodiment of certain steps and/or operations that facilitate real-time selection of query engines from heterogeneous data storage environments. As shown, the steps and/or operations represent a detailed embodiment of engine selection operations 240 earlier discussed.

The dynamic query engine selection technique 4A00 can commence with detecting data statements to analyze a subject dataset (step 402). The data statements might be detected by merely observing a signal (e.g., metadata flag) that indicates new data statements have been issued. One or more statement attributes associated with the detected data statements are calculated and/or recorded (step 404). As indicated, certain statement attributes (e.g., statement type, target dataset, etc.) might be derived directly from the data statements, while other statement attributes (e.g., estimated execution time, estimated execution cost, etc.) might be calculate using various techniques (e.g., formulas, predictive models, etc.). The recorded statement attributes might be stored in a persistent storage facility (e.g., query log file), and/or in some ephemeral storage facility (e.g., in-memory cache), and/or in some combination of these or other storage facilities. The dynamic query engine selection technique 4A00 further retrieves a set of query engine attributes associated with all candidate query engines that can operated over (e.g., access, process, etc.) an instance of the subject dataset (step 406). In this case, merely the query engines that can access an instance of the subject dataset is considered a candidate query engine. Multiple instances of the subject dataset and/or instances of subsets (e.g., aggregates, partitions, shards, etc.) of the subject dataset are often present for various purposes (e.g., data retention, resource balancing, etc.). Some or all of such instances might be accessed to perform the query invoked by the detected data statements.

A set of query engine selection rules corresponding to the data statement owner of the data statements are sorted by priority level (step 408). A data statement owner is the entity that is authorized to manipulate the data statements and/or the results of the data statements. A data statement owner might be defined by an entity identifier, a user identifier (e.g., individual, system, enterprise, etc.), a combination of a user identifier and a client identifier (e.g., of a client device, client application, etc.), and/or other identifiers and/or combinations thereof. In some cases, data statements may have multiple data statement owners, some of which that did not issue the data statements.

When the query engine selection rules for the data statement owner are sorted, certain operations are then performed for each priority level included in the set of query engine selection rules. In the embodiment of FIG. 4A, the priority levels are traversed in ascending order (e.g., priority 1, priority 2, priority 3, etc.). The operations at each priority level include applying the statement attributes to the query engine selection rules having the then-current priority level to determine one or more selection actions (step 412). The determined selection actions are performed over the query engine attributes to determine the candidate query engine or engines that are identified by the evaluated rules (step 414).

When all query engine selection rules of all priority levels are applied, if no candidate query engine is identified (see "No" path of decision 416), then an error is returned (e.g., to the issuer of the data statements). If a candidate query engine is identified (see "Yes" path of decision 416), the remaining candidate query engine is selected as the target query engine (step 418). To avoid having more than one identified candidate query engine when all the rules are applied, a tie-breaking rule might be included in the query engine selection rules. For example, a tie-breaking rule might be assigned a high priority level value (e.g., 999) so that the tie-breaking rule is applied last to facilitate eliminating all but one remaining candidate query engine. Various selection techniques (e.g., round robin, etc.) to select a single item from multiple items can be implemented in the tie-breaking rule.

The dynamic query engine selection technique 4A00 as facilitated by the herein disclosed techniques can be implemented to dynamically select a target query engine from any number and/or types of query engines. One example query engine selection scenario is shown and described as pertaining to FIG. 4B.

FIG. 4B illustrates a query engine selection scenario 4B00 as occurs in systems that facilitate real-time selection of query engines from heterogeneous data storage environments. As an option, one or more variations of query engine selection scenario 4B00 or any aspect thereof may be implemented in the context of the architecture and functionality of the embodiments described herein. The query engine selection scenario 4B00 or any aspect thereof may be implemented in any environment.

The scenario shown in FIG. 4B is merely one example of an implementation of the herein disclosed techniques for real-time selection of query engines from heterogeneous data storage environments. As can be observed, a set of initial candidate query engines (e.g., query engine $142_1$, query engine $142_2$, query engine $142_3$, and query engine $142_4$) are identified. A representative set of query engine attributes (e.g., "model", "status", and "usage") are shown for each of the initial candidate query engines.

The scenario shown in FIG. 4B is merely one example of an implementation of the herein disclosed techniques for real-time selection of query engines from heterogeneous data storage environments. In the embodiment shown, a set of query engine selection rules (e.g., rule $434_1$, rule $434_2$, rule $434_3$, and rule $434_4$) are applied in priority order to the query engines 142 to facilitate selection of a target query engine. Instances of representative rule parameters (e.g., rule "priority" level, rule logic input "conditions", and a "select" action) for each applied rule are shown for reference. Pseudo code is used for certain rule parameters for readability. A representative set of query engine attributes (e.g., "model", "status", and "usage") are also shown for certain query engines comprising query engines 142.

As can be observed, rule $434_1$ is applied to identify four candidate query engines (e.g., query engine $142_1$, query engine $142_2$, query engine $142_3$, and query engine $142_4$) from the query engines 142. Specifically, the input conditions of rule $434_1$ indicate the subject dataset to be accessed by the query engine is identified as "sales_t4". Further, the associated selection action of rule $434_1$ specifies that a candidate query engine is to have access to dataset "sales_t4". Query engine $142_1$, query engine $142_2$, query engine $142_3$, and query engine $142_4$ all satisfy the rule $434_1$. Rule $434_2$ is then applied to the candidate query engines. This rule states that for any data statements (e.g., "<any query>"), a candidate query engine is to be available for use (e.g., "status=avail"). Application of rule $434_2$ eliminates the query engine $142_1$ from the candidate query engines since the status of query engine $142_1$ indicates it is down (e.g., "status:down"). As rule $434_1$ and rule $434_2$ have the same priority level (e.g., "priority:1"), they can be applied in any order, as long as they are both applied.

As earlier mentioned, some statement attributes are calculated. At some point in the rule application process (e.g., when all "priority:1" rules have been applied, when a certain number of candidate query engines remain, etc.), such calculated statement attributes can be determined. These calculated statement attributes can then be analyzed according to one or more rules to facilitate selection of the target query engine. In the query engine selection scenario 4B00, an estimated query execution time (e.g., "eTime") is calculated for query engine $142_2$ and query engine $142_3$. Other query performance estimates and/or calculated statement attributes are possible. Such performance estimates are often a function of the query engine attributes and/or the statement attributes. As such, the estimates are often calculated dynamically at statement execution time.

As shown, when rule $434_3$ is applied to the remaining candidate query engines, query engine $142_4$ is eliminated due to its usage attribute breaching the rule usage threshold. Further, application of rule $434_4$ eliminates the query engine $142_2$ since it does exhibit the minimum estimated query time (e.g., "select:min (eTime)") specified by rule $434_4$. The remaining candidate query engine (e.g., query engine $142_3$) is selected as the target query engine 342. In most cases, when the application of a certain set of rules results in a single candidate query engine, additional rules at higher priority levels are not applied, and the single candidate query engine is selected as the target query engine.

When the target query engine is selected, a physical plan for the target query engine can be generated according to the herein disclosed techniques. A detailed embodiment of such a physical plan generation technique is presented and discussed as pertaining to FIG. 5A.

Figure 5A:
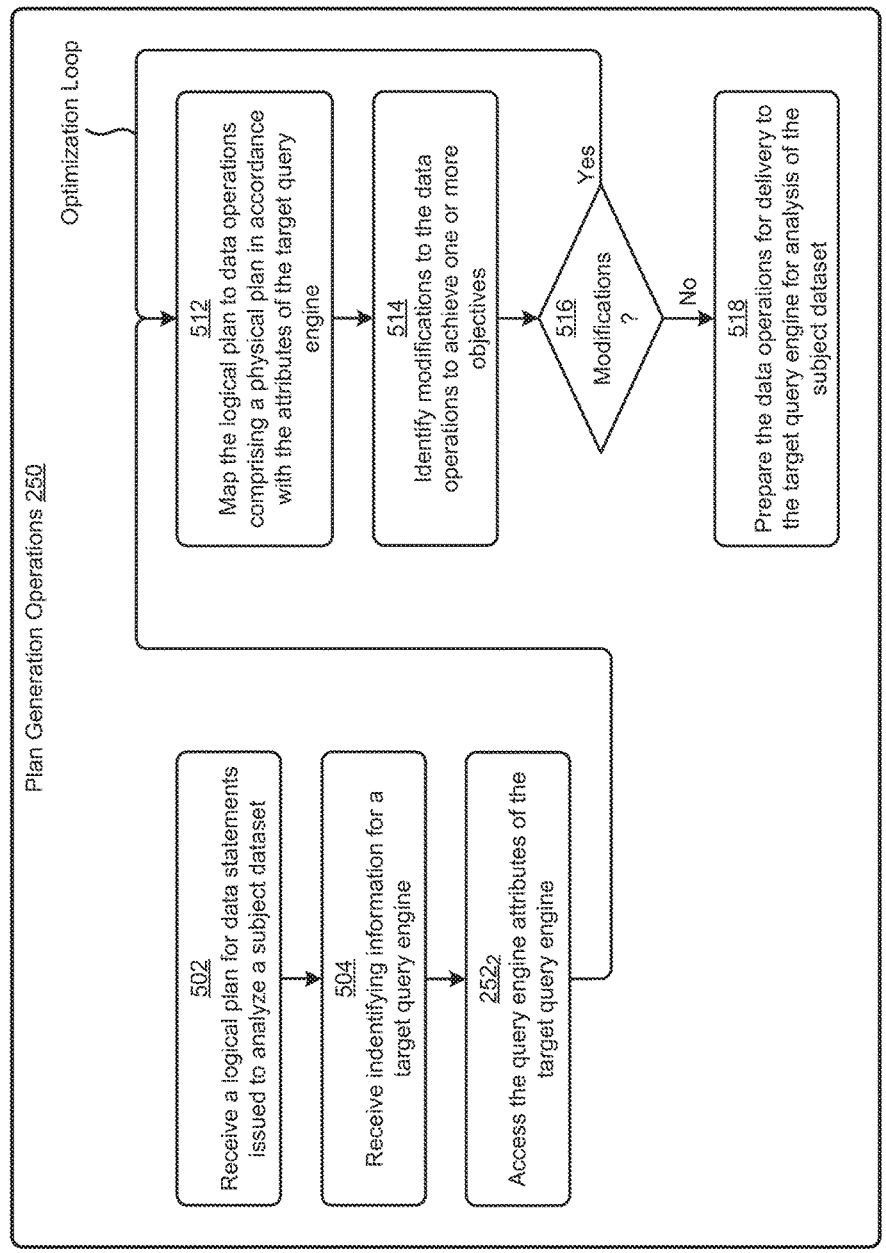
FIG. 5A depicts a physical plan generation technique as implemented in systems that facilitate real-time selection of query engines from heterogeneous data storage environments, according to an embodiment.

FIG. 5A depicts a physical plan generation technique 5A00 as implemented in systems that facilitate real-time selection of query engines from heterogeneous data storage environments. As an option, one or more variations of physical plan generation technique 5A00 or any aspect thereof may be implemented in the context of the architecture and functionality of the embodiments described herein. The physical plan generation technique 5A00 or any aspect thereof may be implemented in any environment.

The physical plan generation technique 5A00 presents one embodiment of certain steps and/or operations that facilitate real-time generation of physical plans for dynamically selected query engines from heterogeneous data storage environments. As shown, the steps and/or operations represent a detailed embodiment of plan generation operations 250 earlier discussed.

The physical plan generation technique 5A00 can commence with receiving a logical plan for data statements that are issued to analyze a subject dataset (step 502). Certain information (e.g., "engineID") is received that identifies a target query engine (step 504). Such a target query engine might be dynamically selected in accordance with the herein disclosed techniques in response to detecting the data statements. The identifying information is used to access the query engine attributes of the target query engine (step $252_2$). Using the foregoing information, the logical plan of the data statements is mapped to a set of data operations comprising a physical plan (step 512).

For example, a "capabilities[ ]" object from the query engine attributes of the target query engine might be consulted to facilitate mapping the logical plan to various data operations. In this case, the data operations might be formatted in accordance with the syntax, data types, and/or other functions and/or parameters specific to the target query engine. Modifications to the data operations are identified to achieve one or more objectives (step 514). These modifications are often engine-specific and might include "hints" that affect a type of JOIN to use, a number of processes to allocate, one or more code generation directives, and/or other aspects of the physical plan. In many cases, the modifications serve to achieve one or more performance objectives, such as a minimization of a query execution cost, a minimization of a query execution time, a minimization of an accessed data size, and/or other objectives. If modifications are identified (see "Yes" path of decision 516) then mapping from the logical plan to the physical plan might be performed (step 512) to validate the modifications (e.g., format changes). This optimization loop can continue until the format of the data operations remains unchanged after modifications (see "No" path of decision 516) so as to facilitate preparation of the data operations for delivery to the target query engine for analysis of the subject dataset (step 518).

Figure 5B:
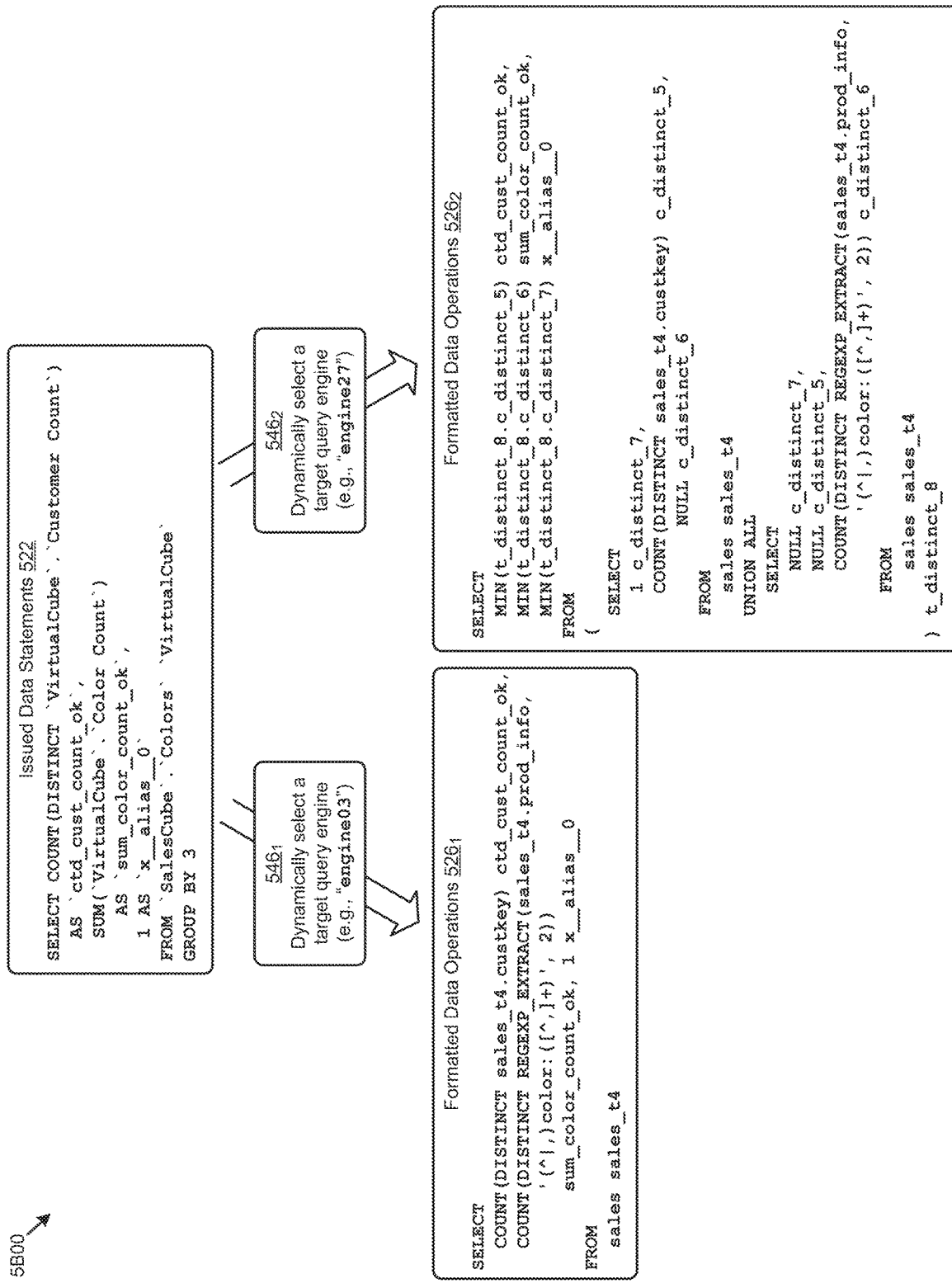
FIG. 5B illustrates a physical plan generation scenario as found in systems that facilitate real-time selection of query engines from heterogeneous data storage environments, according to an embodiment.

The physical plans dynamically generated according to the herein disclosed techniques for various target query engines can exhibit distinct differences, as shown and described in the scenario pertaining to FIG. 5B.

FIG. 5B illustrates a physical plan generation scenario 5B00 as found in systems that facilitate real-time selection of query engines from heterogeneous data storage environments. As an option, one or more variations of physical plan generation scenario 5B00 or any aspect thereof may be implemented in the context of the architecture and functionality of the embodiments described herein. The physical plan generation scenario 5B00 or any aspect thereof may be implemented in any environment.

The scenario shown in FIG. 5B is merely one example of an implementation of the herein disclosed techniques for real-time generation of physical plans for dynamically selected target query engines. As can be observed, representative pseudo code for a set of issued data statements 522 is shown. The issued data statements 522 is structured to select the distinct counts of both "Color" and "Customer" from a subject dataset (e.g., represented by a "VirtualCube" virtual data model). These data statements are transformed into two instances of a physical plan (e.g., comprising formatted data operations) for respective target query engines selected according to the herein disclosed techniques. One instance of formatted data operations $526_1$ is generated when a certain target query engine (e.g., "engine03") is dynamically selected (operation $546_1$). Another instance of formatted data operations $526_2$ is generated when a different target query engine (e.g., "engine27") is dynamically selected (operation $546_2$).

As shown, the pseudo code representing the set of formatted data operations $526_1$ exhibits a structure that closely reflects the structure of the issued data statements 522. This similarity might be due, for example, to a capability of "engine03" to handle multiple distinct counts in a query. In contrast, "engine27" is not able to handle multiple distinct counts in a query, thereby resulting in substantial restructuring of the formatted data operations $526_2$, at least as compared to the structure of the issued data statements 522. In some cases, further modifications to the data operations are implemented to affect query performance. For example, for small queries, a "CODEGEN" feature might be disabled on some query engines (e.g., Impala). This modification might be implemented as a "SET DISABLE_ CODEGEN= true;" statement in the physical plan.

Figure 6:
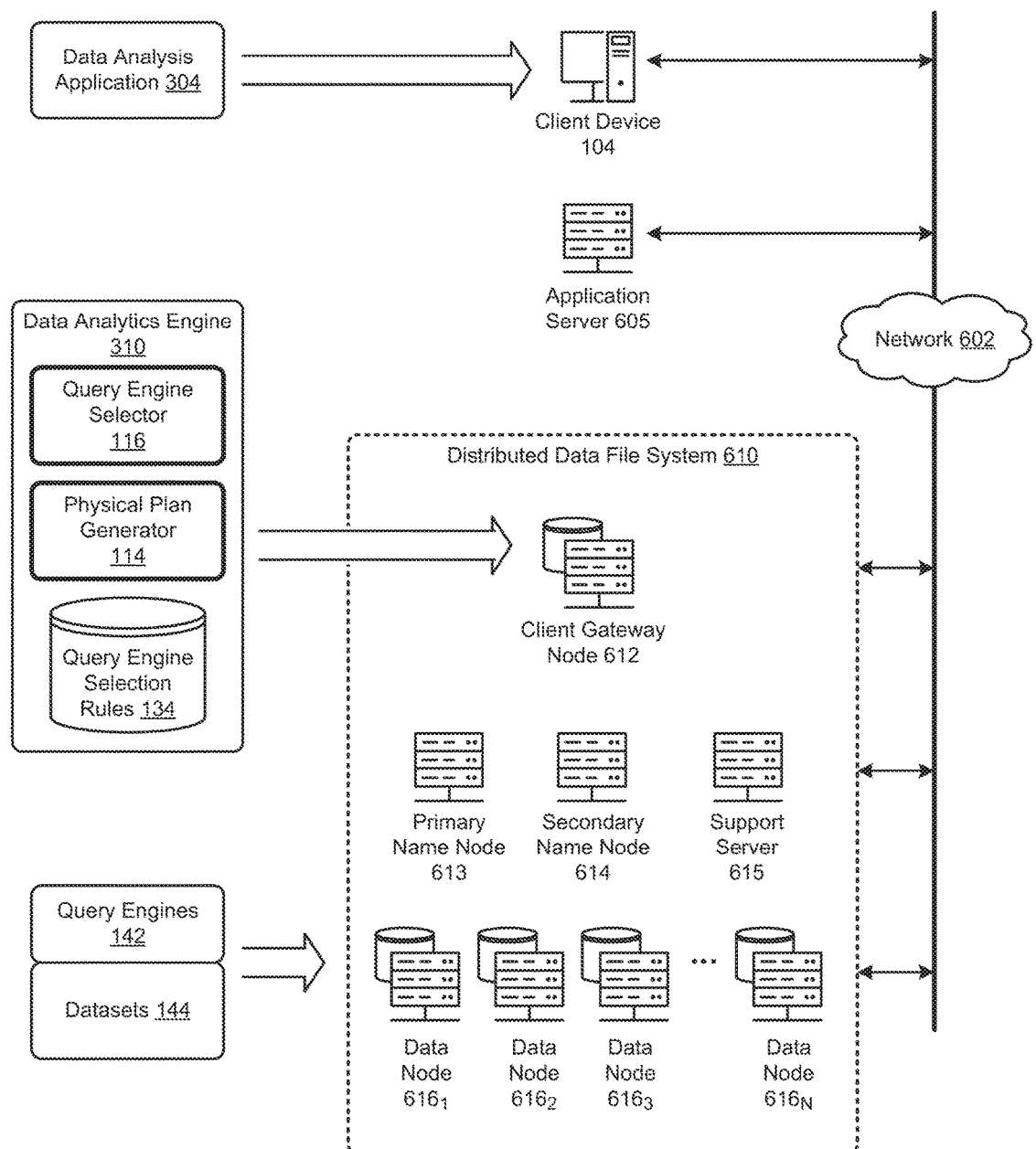
FIG. 6 is a schematic of a computing environment suitable for implementing real-time selection of query engines from heterogeneous data storage environments, according to an embodiment.

One embodiment of a computing environment for implementing the herein disclosed techniques is presented and discussed as pertaining to FIG. 6.

FIG. 6 is a schematic of a computing environment 600 suitable for implementing real-time selection of query engines from heterogeneous data storage environments. As an option, one or more variations of computing environment 600 or any aspect thereof may be implemented in the context of the architecture and functionality of the embodiments described herein.

As shown in FIG. 6, computing environment 600 comprises one or more instances of client device 104 (e.g., a desktop computer, a laptop computer, a mobile phone, etc.), one or more instances of an application server 605, and one or more instances of a distributed data file system 610. The aforementioned devices, servers, and systems can communicate through a network 602 (e.g., a wireless network, a wide area network (WAN), a local area network (LAN), the Internet, an intranet, a private network, etc.). The shown architecture of distributed data file system 610 can facilitate storage and processing of large volumes of data (e.g., in an HDFS framework).

Specifically, the architecture of distributed data file system 610 comprises one or more instances of a client gateway node 612, one or more instances of a primary name node 613, one or more instances of a secondary name node 614, one or more instances of a support server 615 (e.g., executing data analysis processes, etc.), and a plurality of data nodes (e.g., data node $616_1$, data node $616_2$, data node $616_3$, . . . , data node $616_N$). In some implementations, distributed data file system 610 can store large datasets that are physically distributed across multiple computing devices (e.g., the plurality of data nodes) rather than store the datasets entirely on a single computing device comprising a large amount of storage capacity.

To accommodate such distributed storage, the plurality of data nodes can be configured with one or more rack-mounted servers coupled (e.g., by SATA or SAS interconnects) to multiple solid-state drives (SSDs) and/or hard disk drives (HDDs) for storing the data. As an example, when a file is loaded into distributed data file system 610, it is replicated and partitioned (e.g., sharded) into "blocks" of data, which are then distributed and stored across the plurality of data nodes. The primary name node 613 is responsible for storage and management of metadata associated with the data and/or other entities associated with distributed data file system 610 such that, for example, the primary name node 613 can provide data location information for data processing operations.

Other configurations, partitions, and architectures of distributed data file system 610 shown in computing environment 600 are possible. For example, a single-node implementation may have all of the nodes (e.g., client gateway node 612, primary name node 613, the plurality of data nodes, etc.) reside on a single computing device. Also, a small cluster of two nodes may have a first computing device operate as a name node and a second computing device operate as a data node. Distributed data file system 610 can represent any data storage environment.

In one or more embodiments, the aforementioned devices, servers, and systems in computing environment 600 can be configured to implement techniques for real-time selection of query engines from heterogeneous data storage environments, as described herein. As can be observed, certain components earlier described for implementing the herein disclosed techniques are mapped to client device 104 and distributed data file system 610 of computing environment 600. More specifically, as shown, the client device 104 can store program instructions corresponding to the operations of data analysis application 304. Further, client gateway node 612 can store program instructions corresponding to the operations of an instance of the data analytics engine 310 that comprises query engine selector 116, physical plan generator 114, and/or other components. Query engine selection rules 134 accessed by data analytics engine 310 can also be stored in a storage facility (e.g., one or more SSDs and/or HDDs) coupled to client gateway node 612. The plurality of data nodes can comprise the query engines 142 that operate over datasets 144.

Additional Embodiments of the Disclosure

Additional Practical Application Examples

Figure 7:
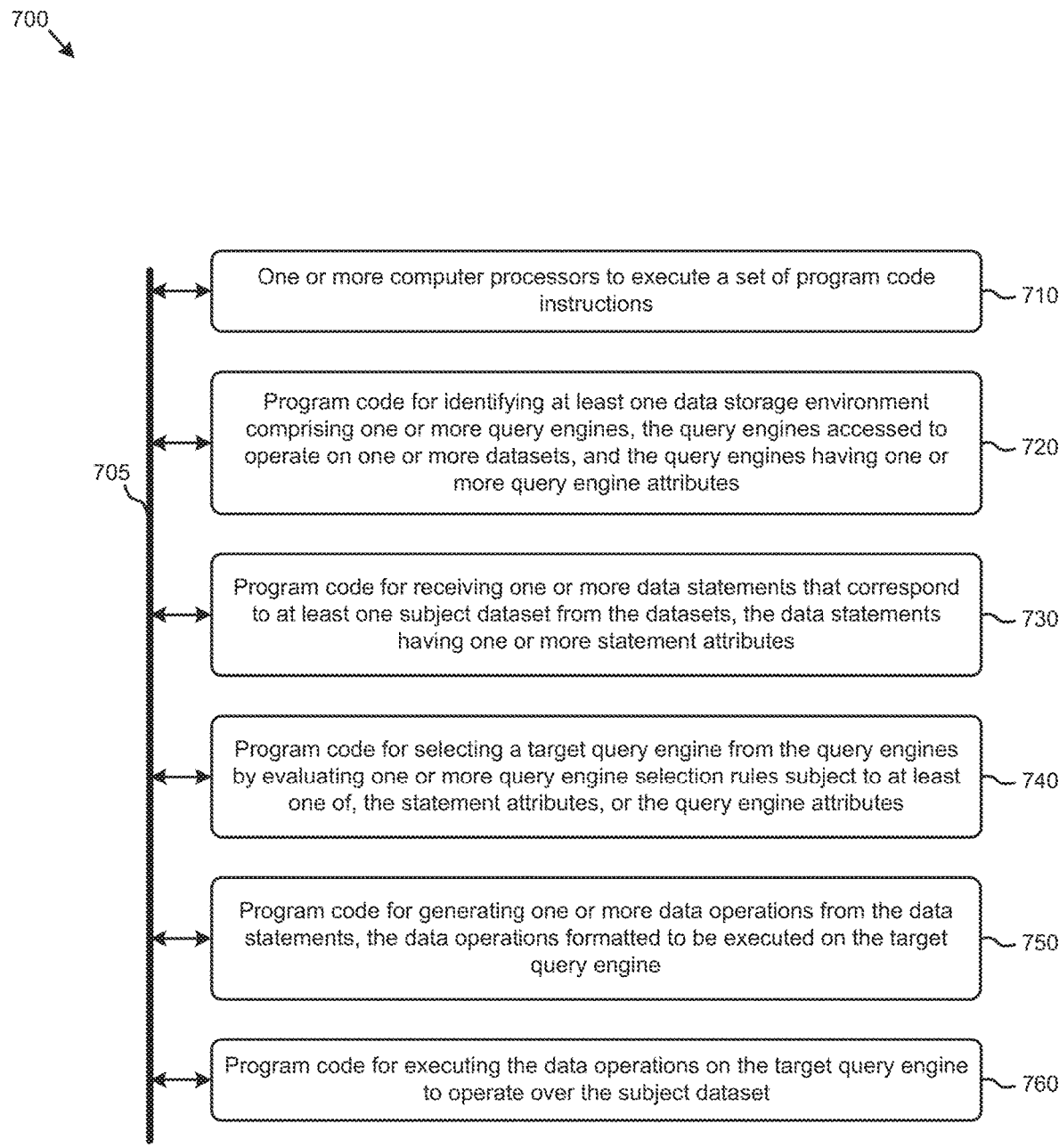
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently identifying and using query engines for executing data operations on a variety of datasets stored in heterogeneous data storage environments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (module 710) and modules for accessing memory to hold program code instructions to perform: identifying at least one data storage environment comprising one or more query engines, the query engines accessed to operate on one or more datasets, and the query engines having one or more query engine attributes (module 720); receiving one or more data statements that correspond to at least one subject dataset from the datasets, the data statements having one or more statement attributes (module 730); selecting a target query engine from the query engines by evaluating one or more query engine selection rules subject to at least one of, the statement attributes, or the query engine attributes (module 740); generating one or more data operations from the data statements, the data operations formatted to be executed on the target query engine (module 750); and executing the data operations on the target query engine to operate over the subject dataset (module 760).

Variations of the foregoing may include more or fewer of the shown modules. Certain variations may perform more or fewer (or different) steps, and/or certain variations may use data elements in more, or in fewer (or different) operations.

Still further, some embodiments include variations in the operations performed, and some embodiments include variations of aspects of the data elements used in the operations.

System Architecture Overview

Additional System Architecture Examples

Figure 8A:
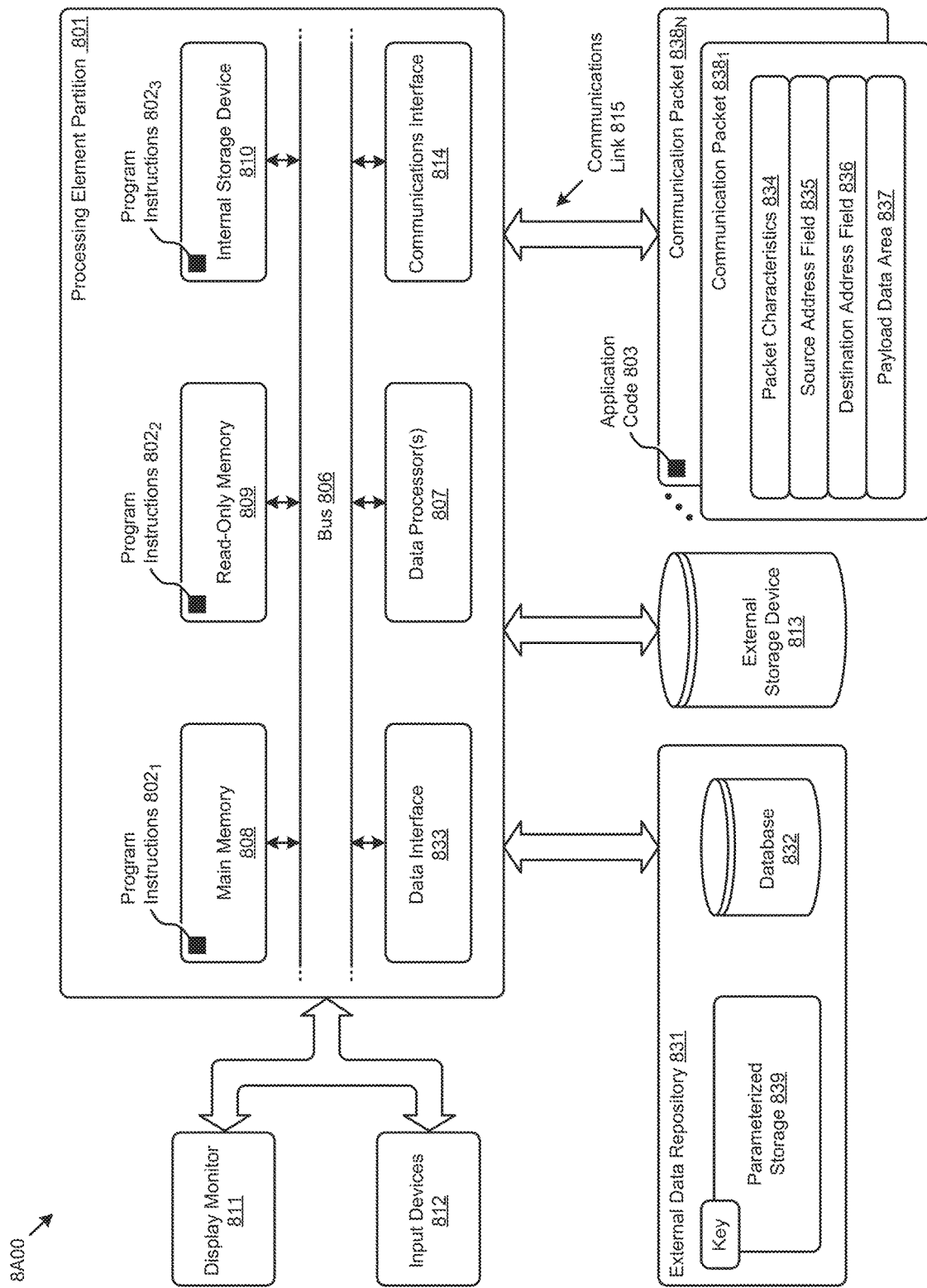
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., data processor 807), a system memory (e.g., main memory 808, or an area of random access memory (RAM)), a non-volatile storage device or non-volatile storage area (e.g., read-only memory or ROM 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets (e.g., communications packet $838_1$, ..., communications packet $838_N$) comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases, the packet characteristics include a version identifier, a packet or payload length, a traffic class, a flow label, etc. In some cases, the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 8B:
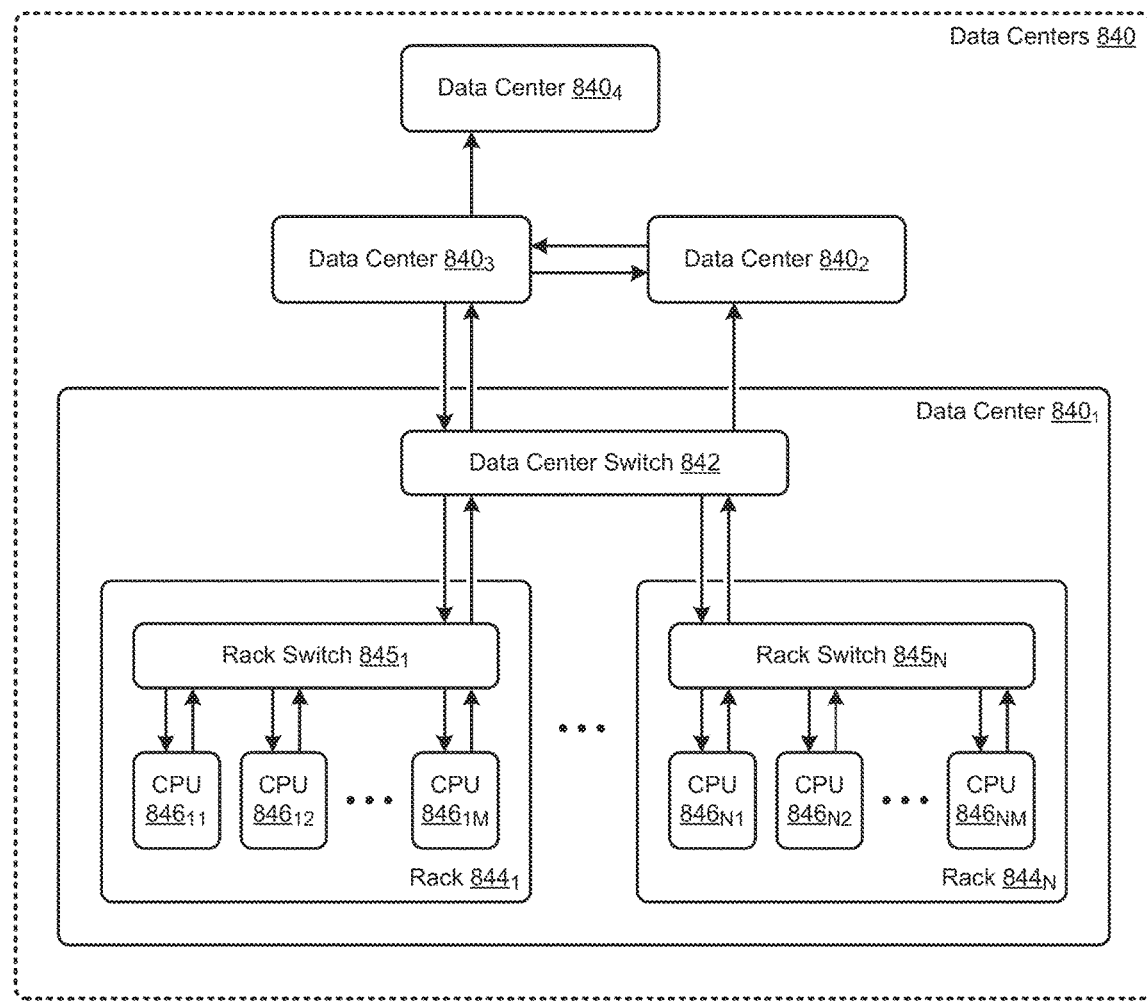

FIG. 8B depicts a block diagram of an instance of a distributed data processing system 8B00 that may be included in a system implementing instances of the herein-disclosed embodiments.

Distributed data processing system 8B00 can include many more or fewer components than those shown. The distributed data processing system 8B00 can be used to store data, perform computational tasks, and/or transmit data between a plurality of data centers 840 (e.g., data center $840_1$, data center $840_2$, data center $840_3$, and data center $840_4$). The distributed data processing system 8B00 can include any number of data centers. Some of the plurality of data centers 840 might be located geographically close to each other, while others might be located far from the other data centers.

The components of distributed data processing system 8B00 can communicate using dedicated optical links and/or other dedicated communication channels, and/or supporting hardware such as modems, bridges, routers, switches, wireless antennas, wireless towers, and/or other hardware components. In some embodiments, the component interconnections of the distributed data processing system 8B00 can include one or more wide area networks (WANs), one or more local area networks (LANs), and/or any combination of the foregoing networks. In certain embodiments, the component interconnections of the distributed data processing system 8B00 can comprise a private network designed and/or operated for use by a particular enterprise, company, customer, and/or other entity. In other embodiments, a public network might comprise a portion or all of the component interconnections of the distributed data processing system 8B00.

In some embodiments, each data center can include multiple racks that each include frames and/or cabinets into which computing devices can be mounted. For example, as shown, data center $840_1$ can include a plurality of racks (e.g., rack $844_1$, ..., rack $844_N$), each comprising one or more computing devices. More specifically, rack $844_1$ can include a first plurality of CPUs (e.g., CPU $846_{11}$, CPU $846_{12}$, ..., CPU $846_{1M}$), and rack $844_N$ can include an Nth plurality of CPUs (e.g., CPU $846_{N1}$, CPU $846_{N2}$, ..., CPU $846_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 8B00. For example, such master processor control functions might pertain to scheduling, data distribution, and/or other processing operations associated with the tasks performed throughout the distributed data processing system 8B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack $844_1$ can be interconnected by a rack switch $845_1$. As another example, the CPUs in rack $844_N$ can be interconnected by a rack switch $845_N$. Further, the plurality of racks within data center $840_1$ can be interconnected by a data center switch 842. The distributed data processing system 8B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for rule-based query engine selection, the method comprising:
    identifying at least one data storage environment comprising one or more query engines, the query engines accessed to operate on one or more datasets, and the query engines having one or more query engine attributes;
    receiving one or more data statements that correspond to at least one subject dataset from the datasets, the data statements having one or more statement attributes;
    selecting a target query engine from the query engines by evaluating one or more of the query engine selection rules subject to at least one of, the statement attributes, or the query engine attributes, selection further comprising:
        applying a set of query engine selection rules in order according to a priority, the set of query engine selection rules specific to an owner of the data statements, each query engine selection rule of the set of query engine selection rules indicative of at least one of an execution time, load, responsiveness, availability, usage and memory used; and
        eliminating the query engines based on satisfaction of the selection rules until a single selected query engine results, the selected query engine satisfying at least one objective of the applied set of query engine selection rules;
    generating one or more data operations from the data statements, at least one of the data operations generated to achieve one or more objectives when accessing the target query engine, the objectives comprising minimization of at least one of, a query execution cost, a query execution time, or an accessed data size, the data operations formatted to be executed on the target query engine; and
    executing the data operations on the target query engine to operate over the subject dataset.

2. The method of claim 1, wherein the target query engine is selected responsive to receiving at least one of the data statements.

3. The method of claim 1, further comprising calculating one or more of the statement attributes.

4. The method of claim 1, further comprising mapping at least one of the statement attributes to a logical data structure representation of the subject dataset to formulate a logical plan, the logical plan comprising at least one programming code object that represents a set of semantics associated with the data statements.

5. The method of claim 4, wherein the logical data structure representation is a virtual multidimensional data model.

6. The method of claim 4, wherein the data operations are derived from the logical plan.

7. The method of claim 4, wherein the logical data structure representation comprises at least one of, one or more dimensions, one or more measures, or one or more relationships, associated with the subject dataset.

8. The method of claim 1, further comprising receiving one or more updates to the query engine attributes, the updates received in response to respective changes to the query engines in the data storage environment.

9. The method of claim 1, wherein at least one of the query engine selection rules are derived from one or more user preferences.

10. The method of claim 1, wherein one or more statement attributes of the data statements are associated with at least one of, a query identifier, a user identifier, a user role, a client identifier, a virtual data model identifier, a timestamp, a set of query traits, an estimated query size, an estimated query cost, or an estimated query execution time.

11. The method of claim 1, wherein the query engine attributes describe at least one of, an engine identifier, a manufacturer, a model, a firmware version, a software version, a status indicator, a usage level value, a set of dataset information, a set of capabilities information, or a set of security information.

12. The method of claim 1 wherein the query engine selection rules are based on attributes of the query engine processing the query and on values of attributes stored in the subject dataset.

13. A computer readable medium, embodied in a non-transitory computer readable medium, the non-transitory computer readable medium having stored thereon a sequence of instructions which, when stored in memory and executed by one or more processors causes the one or more processors to perform a set of acts for rule-based query engine selection, the method the acts comprising:

identifying at least one data storage environment comprising one or more query engines, the query engines accessed to operate on one or more datasets, and the query engines having one or more query engine attributes;

receiving one or more data statements that correspond to at least one subject dataset from the datasets, the data statements having one or more statement attributes;

selecting a target query engine from the query engines by evaluating one or more query engine selection rules subject to at least one of, the statement attributes, or the query engine attributes, selection further comprising:

applying a set of query engine selection rules in order according to a priority, the set of query engine selection rules specific to an owner of the data statements, each query engine selection rule of the set of query engine selection rules indicative of at least one of an execution time, load, responsiveness, availability, usage and memory used; and eliminating the query engines based on satisfaction of the selection rules until a single selected query engine results, the selected query engine satisfying at least one objective of the applied set of query engine selection rules;

generating one or more data operations from the data statements, at least one of the data operations generated to achieve one or more objectives when accessing the target query engine, the objectives comprising minimization of at least one of, a query execution cost, a query execution time, or an accessed data size, the data operations formatted to be executed on the target query engine; and executing the data operations on the target query engine to operate over the subject dataset.

14. The computer readable medium of claim 13, wherein the target query engine is selected responsive to receiving at least one of the data statements.

15. The computer readable medium of claim 13, further comprising instructions which, when stored in memory and executed by the one or more processors causes the one or more processors to perform acts of calculating one or more of the statement attributes.

16. The computer readable medium of claim 13, further comprising instructions which, when stored in memory and executed by the one or more processors causes the one or more processors to perform acts of mapping at least one of the statement attributes to a logical data structure representation of the subject dataset to formulate a logical plan, the logical plan comprising at least one programming code object that represents a set of semantics associated with the data statements.

17. The computer readable medium of claim 16, wherein the logical data structure representation is a virtual multidimensional data model.

18. A system for rule-based query engine selection, comprising:

a storage medium having stored thereon a sequence of instructions; and one or more processors that execute the instructions to cause the one or more processors to perform a set of acts, the acts comprising, identifying at least one data storage environment comprising one or more query engines, the query engines accessed to operate on one or more datasets, and the query engines having one or more query engine attributes;

receiving one or more data statements that correspond to at least one subject dataset from the datasets, the data statements having one or more statement attributes;

selecting a target query engine from the query engines by evaluating one or more query engine selection rules subject to at least one of, the statement attributes, or the query engine attributes, selection further comprising:

applying a set of query engine selection rules in order according to a priority, the set of query engine selection rules specific to an owner of the data statements, each query engine selection rule of the set of query engine selection rules indicative of at least one of an execution time, load, responsiveness, availability, usage and memory used; and eliminating the query engines based on satisfaction of the selection rules until a single selected query engine results, the selected query engine satisfying at least one objective of the applied set of query engine selection rules;

generating one or more data operations from the data statements, at least one of the data operations generated to achieve one or more objectives when accessing the target query engine, the objectives comprising minimization of at least one of, a query execution cost, a query execution time, or an accessed data size, the data operations formatted to be executed on the target query engine; and executing the data operations on the target query engine to operate over the subject dataset.

19. The system of claim 18, wherein the target query engine is selected responsive to receiving at least one of the data statements.

\* \* \* \* \*